United States Patent
Yamaya et al.

(10) Patent No.: US 12,307,677 B2
(45) Date of Patent: May 20, 2025

(54) APPARATUS AND MANUAL PROVIDING APPARATUS

(71) Applicants: Yuriko Yamaya, Tokyo (JP); Shintaro Kawamura, Kanagawa (JP); Seigo Harashima, Kanagawa (JP); Shinya Iguchi, Kanagawa (JP)

(72) Inventors: Yuriko Yamaya, Tokyo (JP); Shintaro Kawamura, Kanagawa (JP); Seigo Harashima, Kanagawa (JP); Shinya Iguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 380 days.

(21) Appl. No.: 17/663,498

(22) Filed: May 16, 2022

(65) Prior Publication Data

US 2022/0375095 A1    Nov. 24, 2022

(30) Foreign Application Priority Data

May 18, 2021   (JP) .................. 2021-083602
May 18, 2021   (JP) .................. 2021-083603

(51) Int. Cl.
*G06T 7/13*      (2017.01)
*G06T 7/136*     (2017.01)
*G06T 7/73*      (2017.01)
*G06V 30/18*     (2022.01)
*G06V 30/19*     (2022.01)
*G06V 30/42*     (2022.01)

(52) U.S. Cl.
CPC ............. *G06T 7/13* (2017.01); *G06T 7/136* (2017.01); *G06T 7/73* (2017.01); *G06V 30/1801* (2022.01); *G06V 30/19147* (2022.01); *G06V 30/42* (2022.01); *G06T 2207/20081* (2013.01)

(58) Field of Classification Search
CPC .. G06T 7/13; G06T 7/136; G06T 7/73; G06T 2207/20084; G06T 2207/20081; G06V 30/1801; G06V 30/19147; G06N 3/02; G06N 20/00
See application file for complete search history.

(56) References Cited

U.S. PATENT DOCUMENTS 6,091,413 A      7/2000  Takeuchi et al.
2017/0127379 A1  5/2017  Mayuzumi et al.

FOREIGN PATENT DOCUMENTS

| JP | 2002-269147 | | 9/2002 |
| JP | 3714378 | | 11/2005 |
| JP | 2019-008684 | | 1/2019 |
| WO | WO-2019003359 | A1 * | 1/2019 |
| WO | WO-2021182199 | A1 * | 9/2021 |

\* cited by examiner

*Primary Examiner* — Sumati Lefkowitz
*Assistant Examiner* — Michael Adam Shariff
(74) *Attorney, Agent, or Firm* — IPUSA, PLLC

(57) ABSTRACT

An apparatus includes circuitry; and a memory storing computer-executable instructions that cause the circuitry to execute acquiring training data, in which image data in a manual and text data in the manual are input data, and in which work procedure information is output data, the work procedure information being supplemented by adding, to the text data in the manual, text data that is generated based on the image data; performing machine learning by using the training data; and generating a machine learning model that outputs the work procedure information in response to receiving input of the image data in the manual and the text data in the manual.

1 Claim, 10 Drawing Sheets

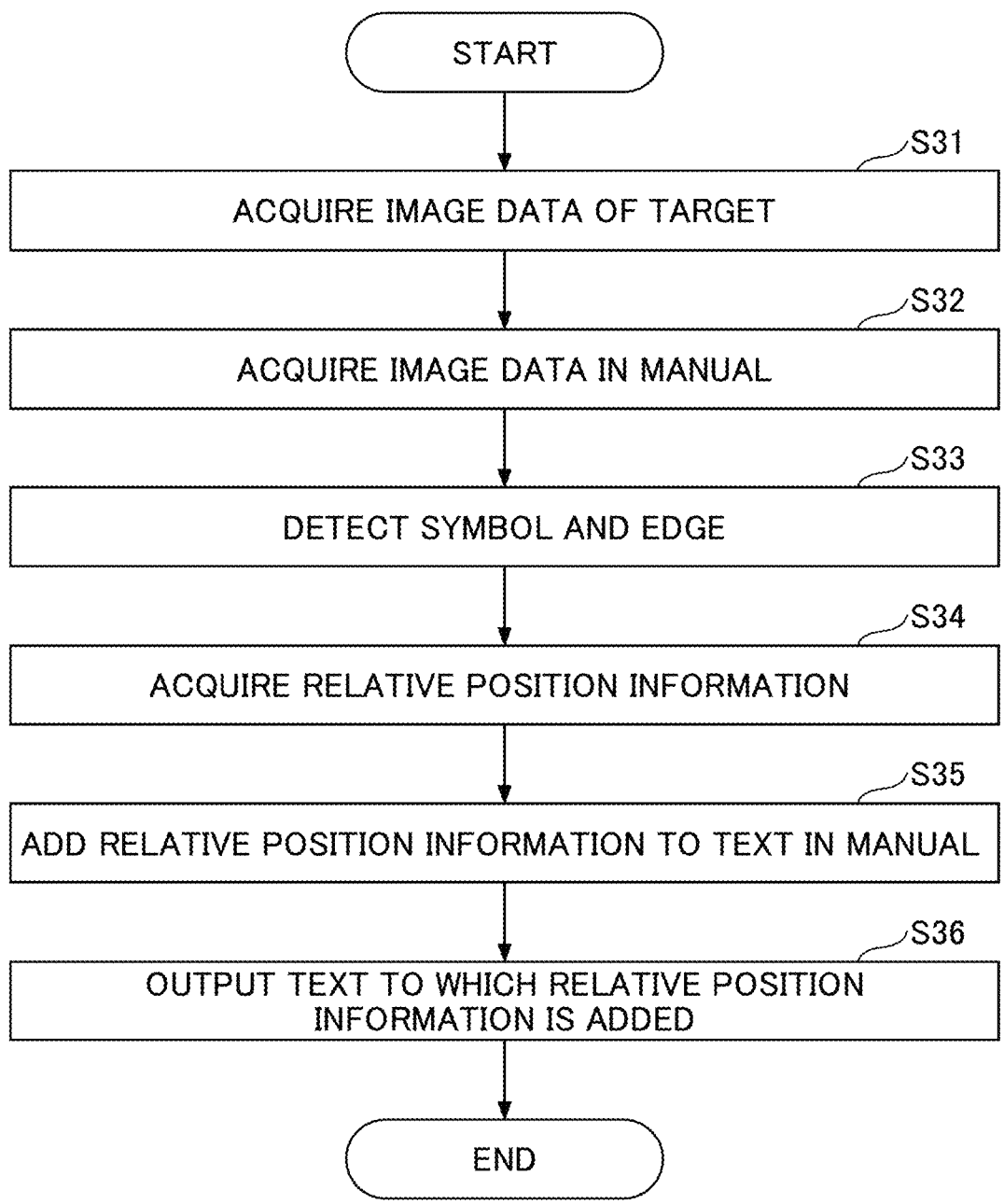

APPARATUS AND MANUAL PROVIDING APPARATUS

CROSS-REFERENCE TO RELATED APPLICATION

The present application is based on and claims priority under 35 U.S.C. § 119 to Japanese Patent Application No. 2021-083602, filed on May 18, 2021, and Japanese Patent Application No. 2021-083603, filed on May 18, 2021, the contents of which are incorporated herein by reference in their entirety.

BACKGROUND OF THE INVENTION

1. Field of the Invention

The present invention relates to an apparatus and a manual providing apparatus.

2. Description of the Related Art

Conventionally, various manuals (also referred to as instruction handbooks and user guides) are used in various situations (Patent Document 1).

For example, one kind of maintenance work by a customer engineer in the manufacturing industry involves repairing the customer's product. One of the most common kinds of work is to replace components of a product. If the customer engineer is unaware of the procedure for replacing components, the customer engineer will replace the corresponding components while referring to a manual. This kind of work is often performed in small spaces and the hands of customer engineers are often soiled. Therefore, there is a need for confirmation by sound that allows the customer engineer to refer to the manual without significantly changing his or her posture or touching the manual with soiled hands.

Patent Document 1: Japanese Unexamined Patent Application Publication No. 2002-269147

SUMMARY OF THE INVENTION

According to one aspect of the present invention, there is provided an apparatus including circuitry; and a memory storing computer-executable instructions that cause the circuitry to execute acquiring training data, in which image data in a manual and text data in the manual are input data, and in which work procedure information is output data, the work procedure information being supplemented by adding, to the text data in the manual, text data that is generated based on the image data; performing machine learning by using the training data; and generating a machine learning model that outputs the work procedure information in response to receiving input of the image data in the manual and the text data in the manual.

BRIEF DESCRIPTION OF THE DRAWINGS

FIG. 11 is a flowchart of a manual providing process according to the second embodiment of the present invention.

DESCRIPTION OF THE EMBODIMENTS

Figure 1:
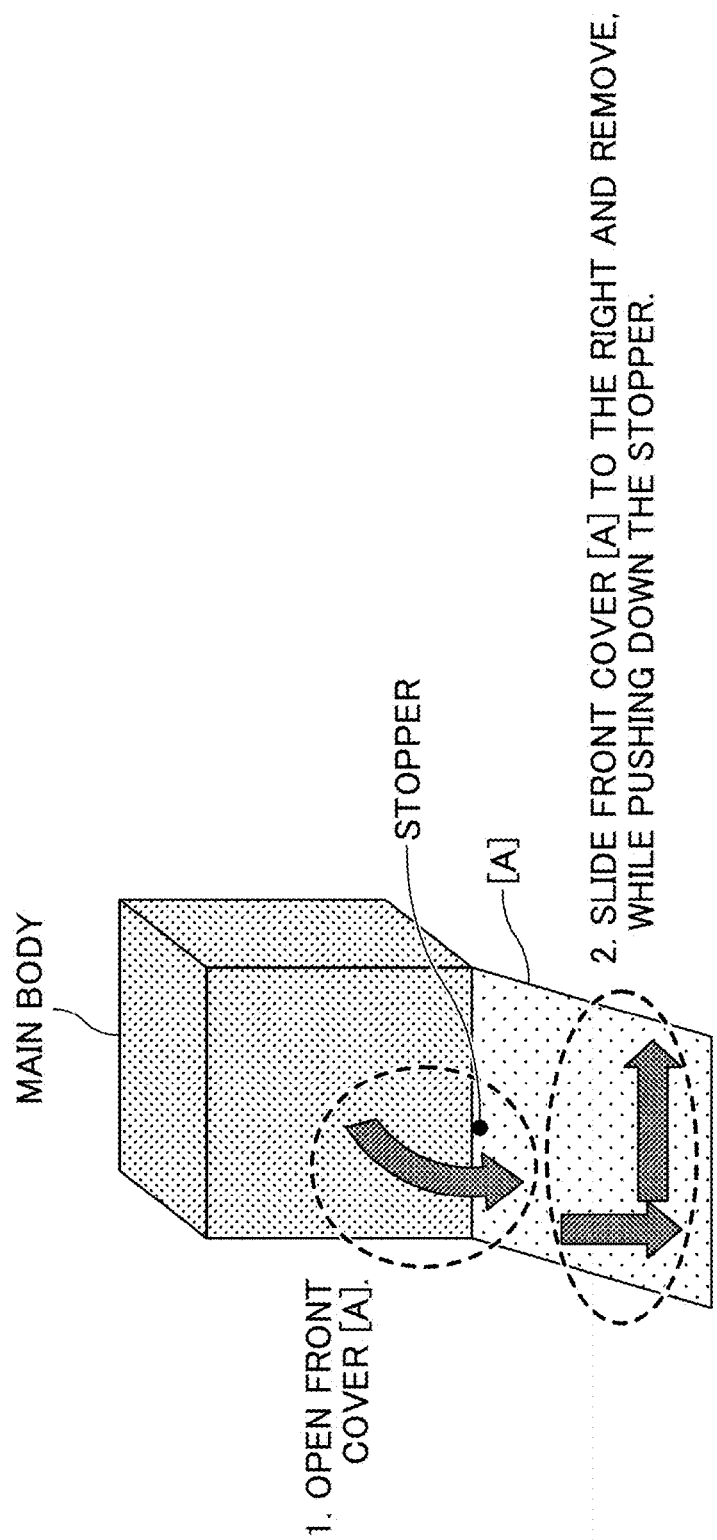
FIG. 1 is a diagram for explaining an outline according to a first embodiment of the present invention.

In the description of a manual, in addition to the text explaining the procedure, there are images superimposed with marks indicating the positional relationship between the target component and surrounding components or the direction of moving the target component or the direction of removing the target component. Further, the surrounding components indicated in the image may not be mentioned in the text describing the procedure. For this reason, only having the manual text read out loud would result in a lack of information on the positional relationship between the target component and the surrounding components, as well as a lack of information on the direction in which the target component is to be moved or removed, and consequently sufficient information cannot be provided for performing the work.

A problem to be addressed by an embodiment of the present invention is to enable the manual to be understood without an image of the manual.

First Embodiment

Hereinafter, each embodiment will be described with reference to the accompanying drawings. In the present specification and the drawings, for the elements having substantially the same functional configuration, the overlapping description is omitted by adding the same reference numerals.

DESCRIPTION OF TERMS

As used in the present specification, a "manual (also referred to an instruction handbook or a user guide)" refers to an electronic manual that includes text data and image data. For example, the manual may be a manual for repairing precision devices such as multifunction peripherals, but is not limited thereto and may be any manual. For example, a customer engineer or the like may replace a component of a precision device such as a multifunction peripheral or the like for the purpose of repairing the precision device such as a multifunction peripheral or the like based on the manual.

As used in the present specification, "symbols" are symbols such as arrows, circles, triangles, squares, etc., superimposed on a photo, an illustration, etc., indicating the procedure of the work, in image data in a manual. A symbol indicates the position of the target component (component to be worked on). A symbol may also represent the work (e.g., removal) to be performed on the target component.

As used the present specification, an "edge" is the edge (i.e., boundary) detected in image data in the manual. Based on the edges, the range of components such as surrounding components (components that exist around the target component) is identified.

<Outline>

FIG. 1 is a diagram illustrating an outline of an embodiment of the present invention. The embodiment of the present invention provides work procedure information that is supplemented by adding text data based on the image data in the manual to the text data in the manual.

For example, suppose the manual describes the procedure of the work illustrated in FIG. 1. That is, the manual includes the following text data, "1. Open front cover [A]. 2. Slide front cover [A] to the right and remove, while pushing down the stopper.", and includes image data. It is assumed that the image data is superimposed with a mark indicating "[A]", a mark indicating "main body", a mark indicating "stopper", a mark indicating the direction of moving the front cover, a mark indicating the direction of removing the front cover, and a mark indicating the direction of moving the stopper.

In the manual, the target component (here, A) is indicated in the image data, and is described in the text data as "front cover [A]". Note that there may be cases where there is no description by text data (i.e., only indicated by a mark in the image data). Marks in the image data have multiple meanings and include many kinds of information such as the direction in which the component is to be moved, the direction in which the component is to be removed, the instructions with respect to the target component described in the text data, and the order of the procedures. In an embodiment of the present invention, machine learning is performed by using training data, in which image data (image data in the manual) including various kinds of information and text data in the manual are the input data, and text data (hereinafter, also referred to as "work procedure information") representing the contents of the work without omission is the output data. Then, a machine learning model generated by machine learning can be used to present work procedure information.

The following is an example of work instruction information.

Before (i.e., Text Data in the Manual)
1. Open the front cover [A].
2. Slide front cover [A] to the right and remove, while pushing down the stopper.

After (i.e., Work Procedure Information Supplemented by Adding Text Data Based on Images in the Manual to Text Data in the Manual)
1. Open the front cover on the front side of the device toward yourself.
2. Slide the front cover to the right while pushing down the stopper that is slightly to the left from the center of the joint between the main body and the front cover, and remove the front cover.

As described above, it can be seen that work procedure information is presented, in which the Before text data is supplemented by the positions where the target component and the surrounding components are installed, the direction of the operation, and the like. Note that the notation of [A] that is used in cases where the text is confirmed together with the image in this example, may be deleted from the work procedure information or may be replaced with a description of the content indicated by [A].

<Overall Configuration>

Figure 2:
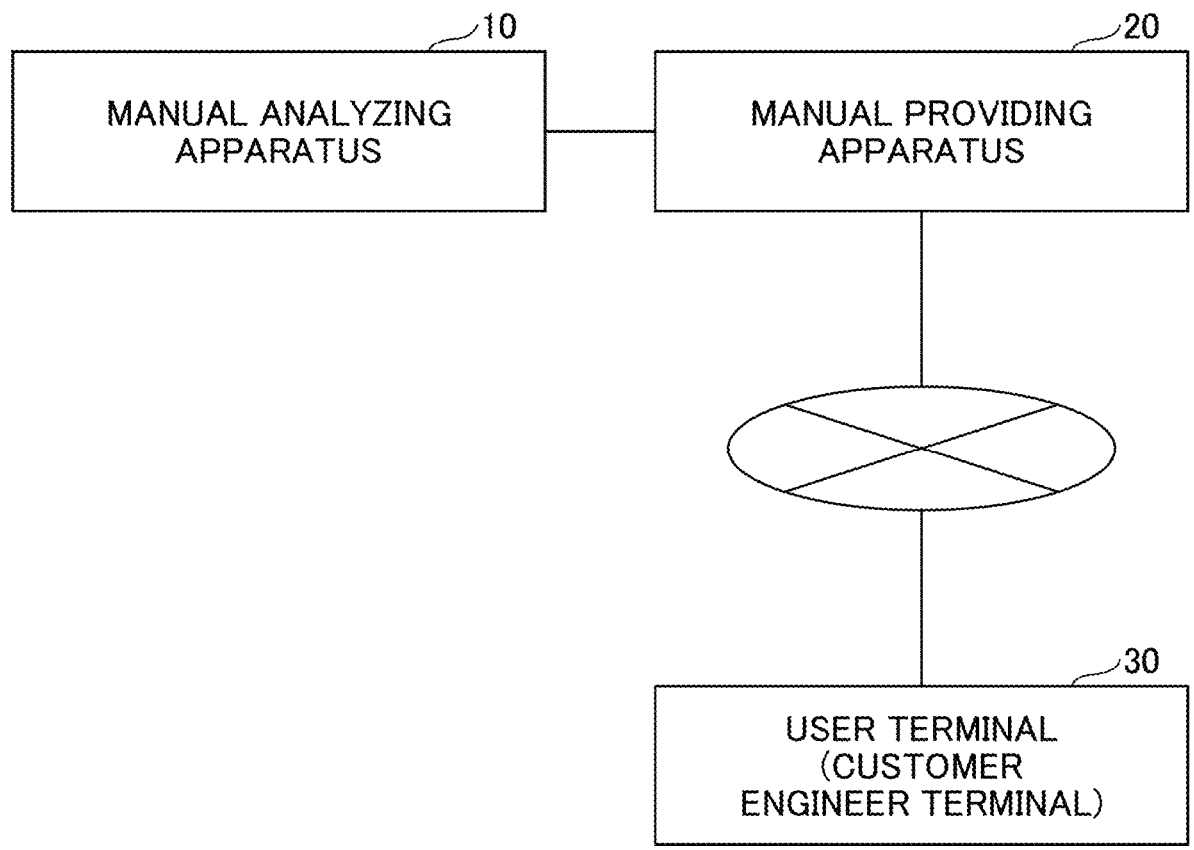
FIG. 2 is an overall configuration diagram according to the first embodiment of the present invention.

FIG. 2 is an overall configuration diagram according to an embodiment of the present invention. As illustrated in FIG. 2, a manual reading support system 1 can include a manual analyzing apparatus 10, a manual providing apparatus 20, and a user terminal (customer engineer terminal). The user terminal 30 can transmit and receive data to and from the manual providing apparatus 20 via any network. Although the manual analyzing apparatus 10 and the manual providing apparatus 20 are described as two apparatuses herein, the manual analyzing apparatus 10 and the manual providing apparatus 20 may be implemented as one apparatus.

The manual analyzing apparatus 10 analyzes a manual so that an electronic manual including text data and image data can be understood by only text data. Specifically, the manual analyzing apparatus 10 acquires training data, in which the image data and the text data in the manual are input data, and work procedure information, which is the supplemented by adding text data generated based on the image data in the manual to the text data in the manual, is output data. The manual analyzing apparatus 10 uses the training data to perform machine learning and generates a machine learning model by which the work procedure information is output when the image data and text data in the manual are input.

Upon request from the user terminal 30, the manual providing apparatus 20 presents work procedure information that is supplemented such that the electronic manual including the text data and the image data can be understood by only the text data.

The manual providing apparatus 20 may present previously generated work procedure information (which may be stored in any storage device) or may generate and present work procedure information in response to a request from the user terminal 30.

When previously generated work procedure information is presented, the manual providing apparatus 20 acquires, from the user terminal 30, information (e.g., image data) for identifying a target object (e.g., a component of a precision device such as a multifunction peripheral, hereinafter, also referred to as a "target"). The manual providing apparatus 20 identifies at least one of image data or text data in the manual corresponding to the information for identifying a target. The manual providing apparatus 20 identifies previously generated work procedure information associated with at least one of image data or text data in the manual. The manual providing apparatus 20 outputs the work procedure information to the user terminal 30.

When the work procedure information is generated and presented in response to a request from the user terminal 30, the manual providing apparatus 20 acquires information (for example, image data) for identifying a target (for example, a component in a precision device such as a multifunction peripheral) from the user terminal 30. The manual providing apparatus 20 identifies image data and text data in the manual corresponding to the information for identifying a target. The manual providing apparatus 20 inputs image data and text data in the manual to the machine learning model to cause the machine learning model to output work procedure information. The manual providing apparatus 20 outputs the work procedure information to the user terminal 30.

The user terminal 30 (customer engineer terminal) is a terminal used by a person using a manual according to an embodiment of the present invention (e.g., a customer engineer who repairs a precision device such as a multifunction peripheral). Specifically, the user terminal 30 transmits information (for example, image data) for identifying the target to the manual providing apparatus 20. The user terminal 30 receives the work procedure information on the target from the manual providing apparatus 20. For example, the user terminal 30 may be a smart device, smart glasses, or the like.

The user terminal 30 (customer engineer terminal) may use the work procedure information stored in the user terminal 30 (customer engineer terminal).

<Hardware Configuration>

Figure 3:
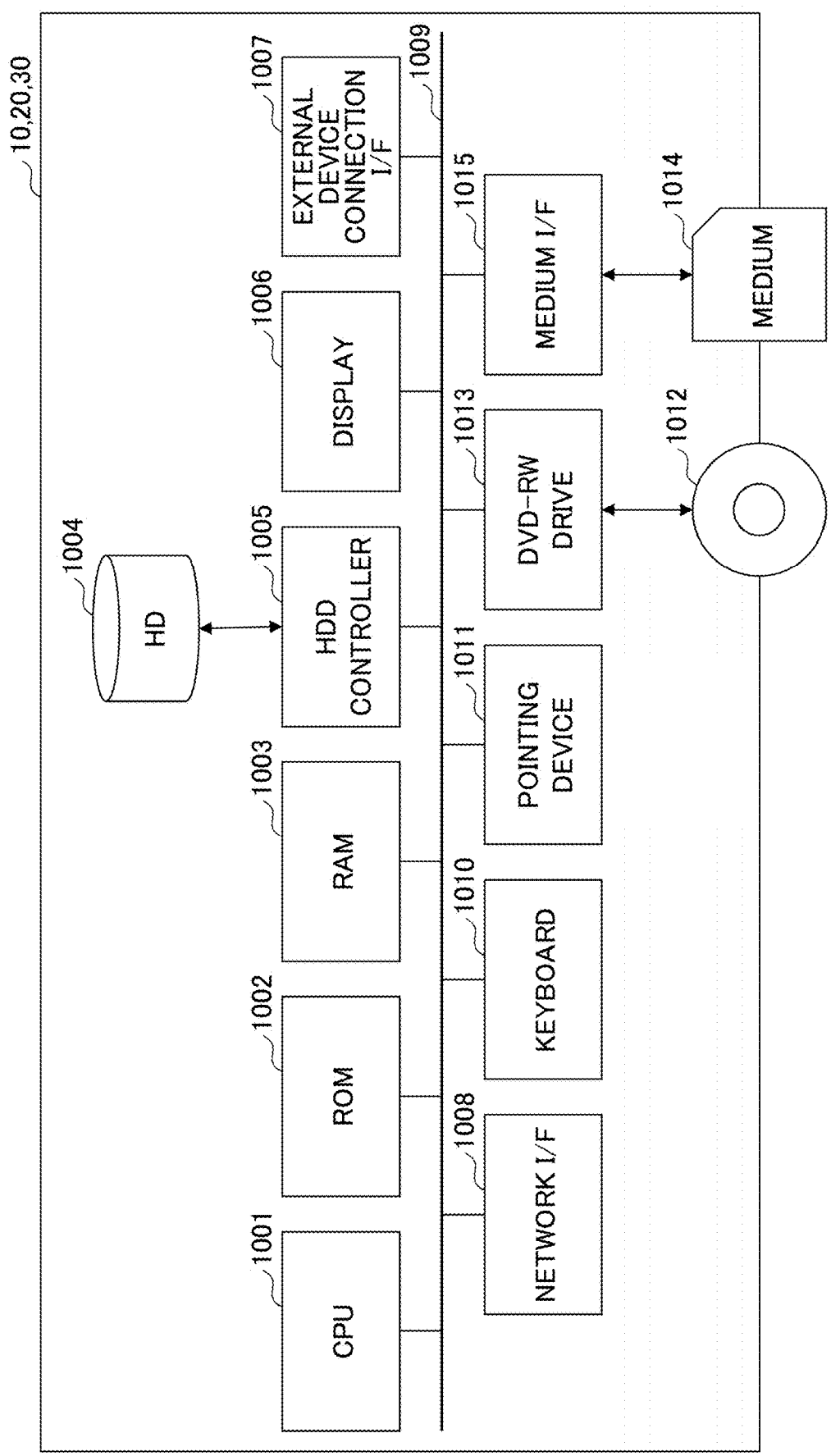
FIG. 3 is a diagram illustrating a hardware configuration of a manual analyzing apparatus, a manual providing apparatus, and a user terminal according to the first embodiment of the present invention.

FIG. 3 is a diagram illustrating a hardware configuration of the manual analyzing apparatus 10, the manual providing apparatus 20, and the user terminal 30 according to an embodiment of the present invention.

As illustrated in FIG. 3, the manual analyzing apparatus 10, the manual providing apparatus 20, and the user terminal 30 are configured by a computer, and as illustrated in FIG. 3, includes a central processing unit (CPU) 1001, a read-only memory (ROM) 1002, a random access memory (RAM) 1003, a hard disk (HD) 1004, a hard disk drive (HDD) controller 1005, a display 1006, an external device connection I/F (interface) 1007, a network I/F 1008, a data bus 1009, a keyboard 1010, a pointing device 1011, a Digital Versatile Disk Rewritable (DVD-RW) drive 1013, and a medium I/F 1015.

Of these, the CPU 1001 controls the operation of the entire manual analyzing apparatus 10, the manual providing apparatus 20, and the user terminal 30. The ROM 1002 stores a program used for driving the CPU 1001, such as an initial program loader (IPL). The RAM 1003 is used as a work area of the CPU 1001. The HD 1004 stores various kinds of data such as a program. The HDD controller 1005 controls the reading or writing of various kinds of data to the HD 1004 according to the control of the CPU 1001. The display 1006 displays various kinds of information such as cursors, menus, windows, characters, or images. The external device connection I/F 1007 is an interface for connecting various external devices. In this case, the external device may be, for example, a Universal Serial Bus (USB) memory or a printer. The network I/F 1008 is an interface for performing data communication using a communication network. The data bus 1009 is an address bus, a data bus, or the like for electrically connecting components such as the CPU 1001 illustrated in FIG. 3.

The keyboard 1010 is a type of input means having a plurality of keys for inputting characters, numbers, various instructions, and the like. The pointing device 1011 is a type of input means for selecting and executing various instructions, selecting a processing target, moving a cursor, and the like. The DVD-RW drive 1013 controls the reading or writing of various kinds of data to a DVD-RW 1012 as an example of a removable recording medium. The medium is not limited to a DVD-RW, but may be a Digital Versatile Disc Recordable (DVD-R), etc. The medium I/F 1015 controls the reading or writing (storage) of data to the recording medium 1014, such as a flash memory.

<Functional Blocks>

Hereinafter, functional blocks of the manual analyzing apparatus 10 will be described with reference to FIG. 4, and functional blocks of the manual providing apparatus 20 will be described with reference to FIG. 5.

Figure 4:
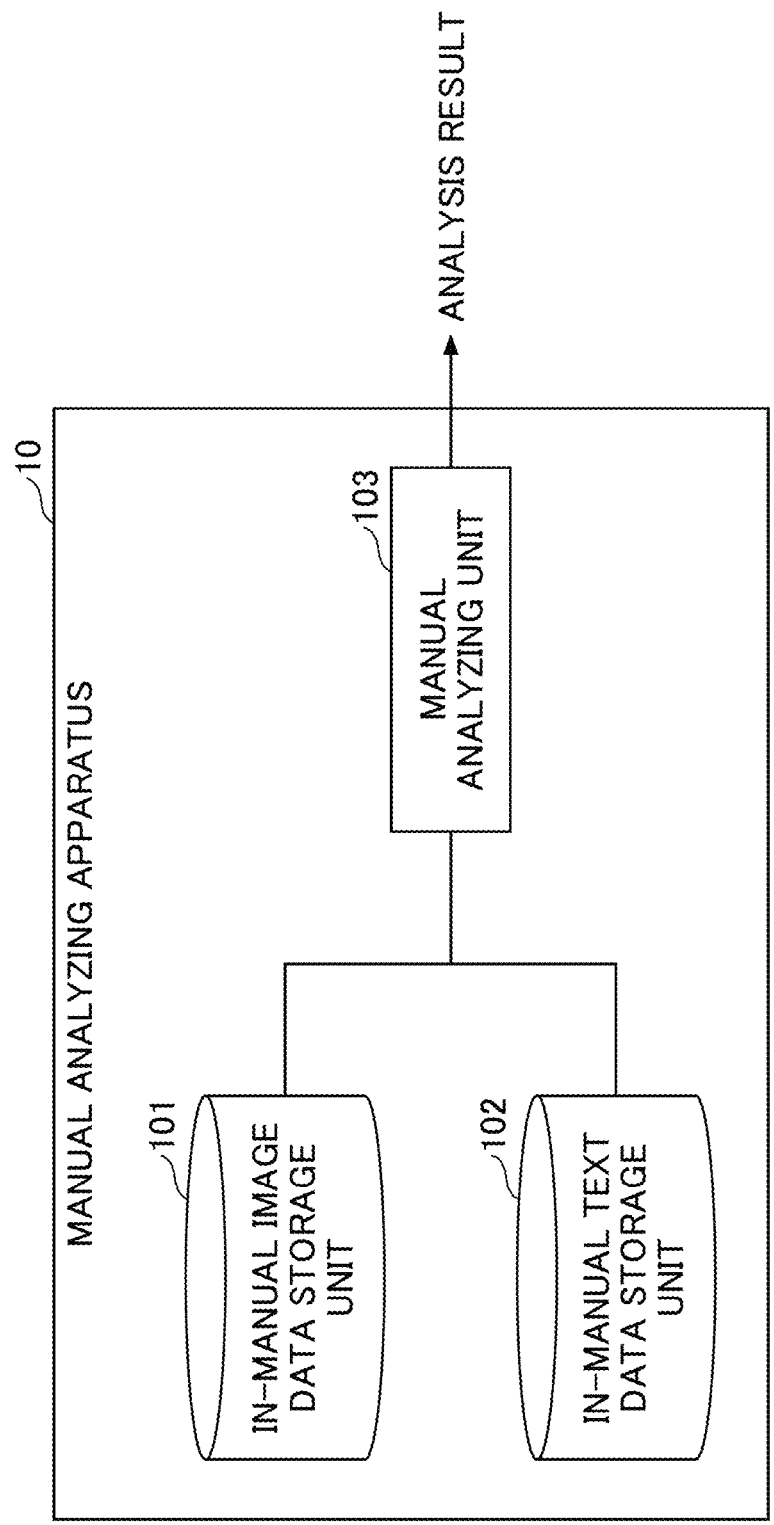
FIG. 4 is a functional block diagram of a manual analyzing apparatus according to the first embodiment of the present invention.

FIG. 4 is a functional block diagram of the manual analyzing apparatus 10 according to an embodiment of the present invention. As illustrated in FIG. 4, the manual analyzing apparatus 10 includes an in-manual image data storage unit 101, an in-manual text data storage unit 102, and a manual analyzing unit 103. The manual analyzing apparatus 10 functions as the manual analyzing unit 103 by executing a program. Each of the units will be described below.

The in-manual image data storage unit 101 stores the image data included in the manual. For example, the image data may be electronic data such as photos, illustrations, or the like indicating a procedure of the work. The image data can be superimposed with a mark indicating a target component (a component that is the target of work, for example, a component to be replaced by a customer engineer), a mark indicating a surrounding component, a mark indicating the direction in which the component is to be moved, a mark indicating the direction in which the component is to be removed, and the like.

The in-manual text data storage unit 102 stores the text data included in the manual.

The manual analyzing unit 103 performs a manual analyzing process. Specifically, the manual analyzing unit 103 acquires image data stored in the in-manual image data storage unit 101 and text data stored in the in-manual text data storage unit 102. The manual analyzing unit 103 acquires the text data that has been supplemented (the text data supplemented by the text data generated based on the image data in the manual). The manual analyzing unit 103 associates the "image data in the manual and the text data in the manual" with the "supplemented text". The manual analyzing process will be described in detail with reference to FIG. 6.

Figure 5:
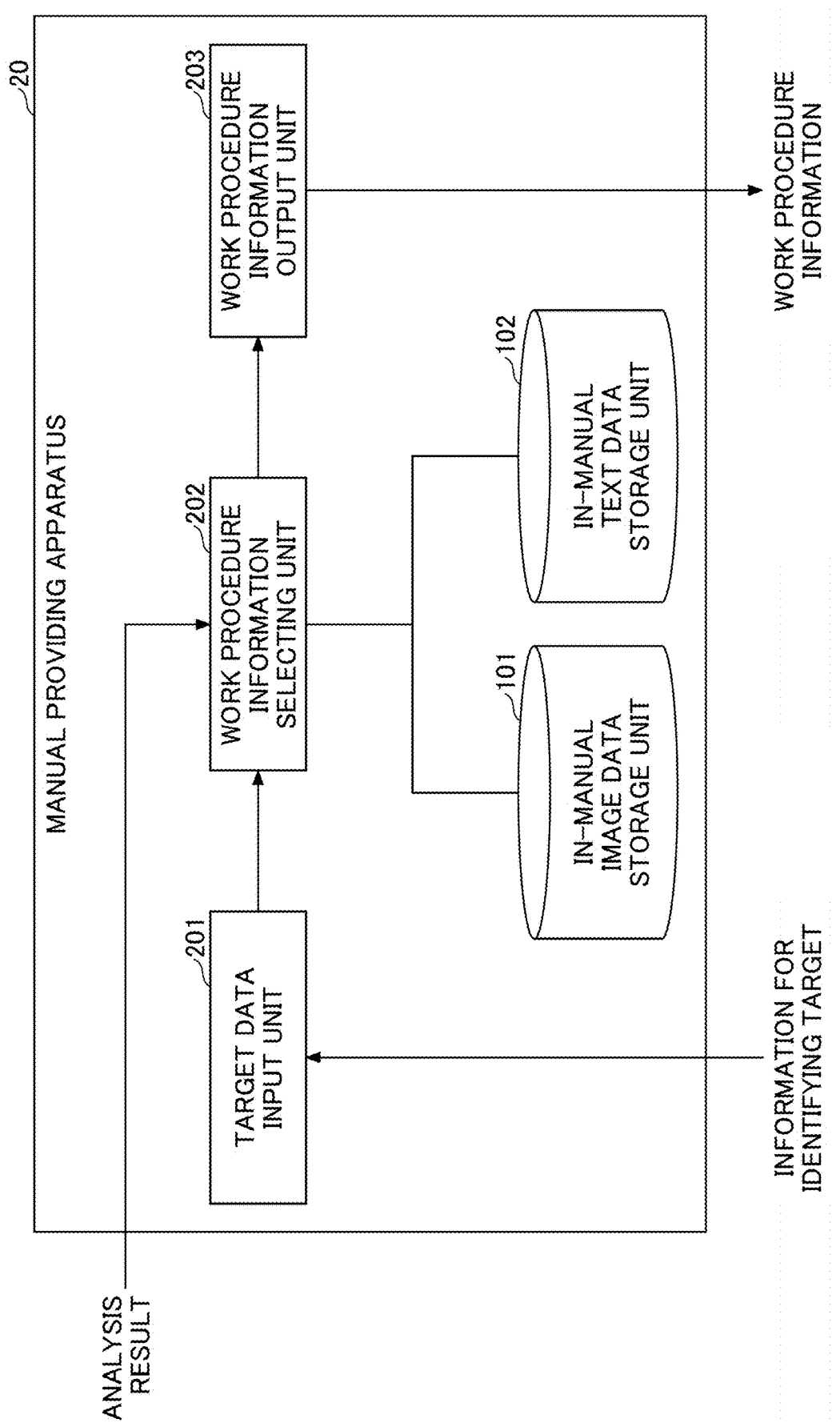
FIG. 5 is a functional block diagram of a manual providing apparatus according to the first embodiment of the present invention.

FIG. 5 is a functional block diagram of a manual providing apparatus according to an embodiment of the present invention. As illustrated in FIG. 5, the manual providing apparatus 20 includes a target data input unit 201, a work procedure information selecting unit 202, a work procedure information output unit 203, the in-manual image data storage unit 101, and the in-manual text data storage unit 102. The manual providing apparatus 20 functions as the target data input unit 201, the work procedure information selecting unit 202, and the work procedure information output unit 203 by executing a program. Each of these units will be described below.

The manual providing apparatus 20 may use the in-manual image data storage unit 101 and the in-manual text data storage unit 102 of the manual analyzing apparatus 10.

The target data input unit 201 acquires information (for example, image data, sound, text, or the like) for identifying the target (for example, a component of a precision device such as a multifunction peripheral) from the user terminal 30.

The work procedure information selecting unit 202 may present previously generated work procedure information (which may be stored in any memory device) or may generate and present work procedure information in response to a request from the user terminal 30.

When presenting the previously generated work procedure information, the work procedure information selecting unit 202 identifies at least one of image data or text data in the manual corresponding to the information for identifying the target acquired by the target data input unit 201. The work procedure information selecting unit 202 identifies the previously generated work procedure information associated with at least one of the image data or the text data in the manual.

When generating and presenting the work procedure information in response to a request from the user terminal 30, the work procedure information selecting unit 202 identifies image data in the manual and text data in the manual corresponding to the information for identifying the target acquired by the target data input unit 201. The work procedure information selecting unit 202 inputs image data in the manual and text data in the manual to a machine learning model to cause the machine learning model to output work procedure information.

The work procedure information output unit 203 outputs the work procedure information to the user terminal 30. For example, the work procedure information output unit 203 transmits the sound data of the work procedure information to the user terminal 30.

<Processing Method>

Hereinafter, the manual analyzing process will be described with reference to FIG. 6, and the manual providing process will be described with reference to FIG. 7.

Figure 6:
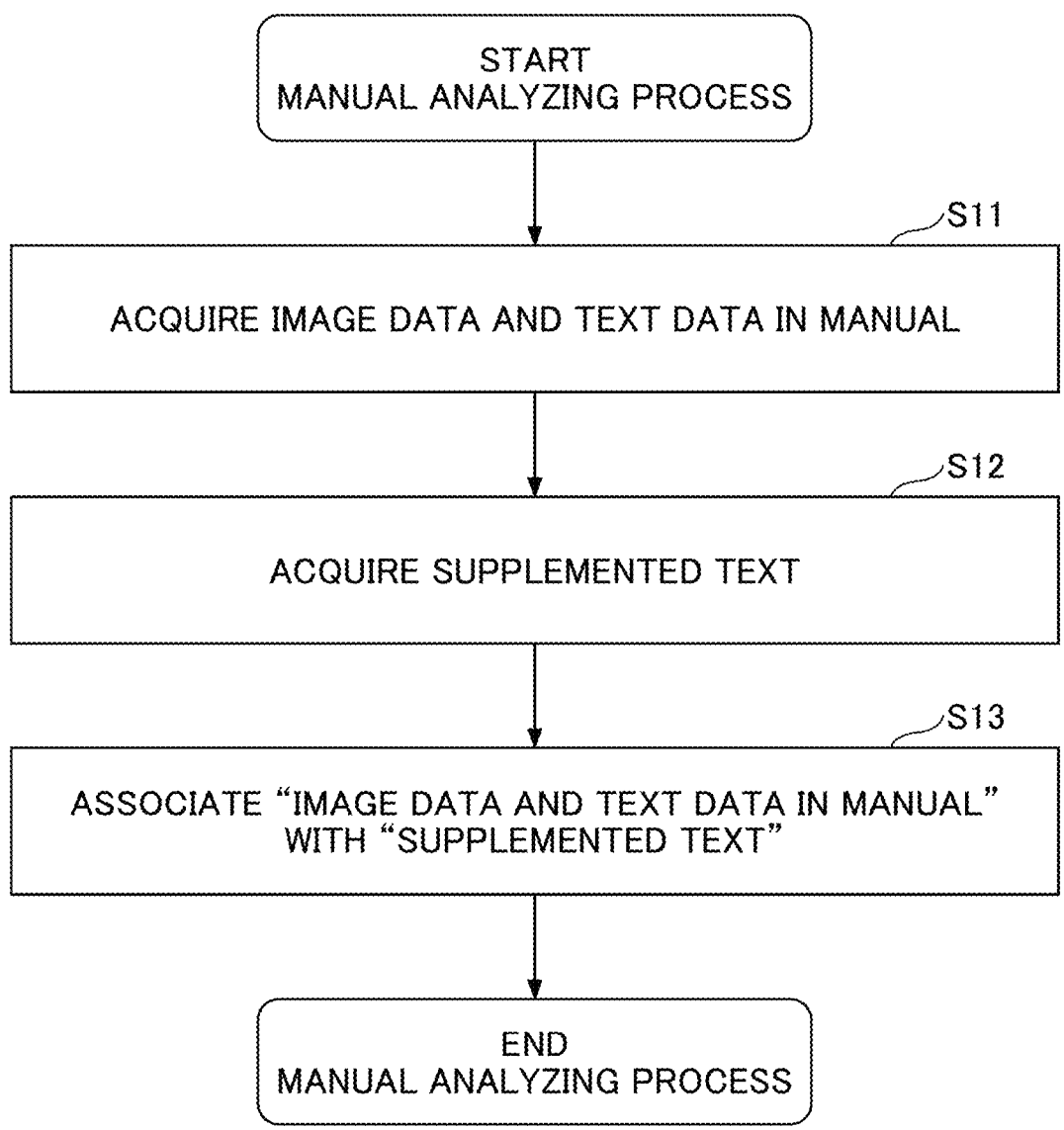
FIG. 6 is a flowchart of a manual analyzing process according to the first embodiment of the present invention.

FIG. 6 is a flowchart of a manual analyzing process according to an embodiment of the present invention.

In step S11, the manual analyzing unit 103 acquires image data stored in the in-manual image data storage unit 101 and text data stored in the in-manual text data storage unit 102. This image data and text data serve as training data.

In step S12, the manual analyzing unit 103 acquires supplemented text data (the text data supplemented by the text data generated based on the image data in the manual). This supplemented text data serves as the training data. For example, a system administrator and the like creates the supplemented text data.

In step S13, the manual analyzing unit 103 associates "the image data in the manual and the text data in the manual" with the "supplemented text".

Specifically, the manual analyzing unit 103 acquires the training data, in which the image data in the manual acquired in step S11 and the text data in the manual are input data and the supplemented text data acquired in step S12 (that is, the work procedure information supplemented by adding the text data generated based on the image data to the text data in the manual) is output data, and uses the training data to perform machine learning. The manual analyzing unit 103 generates a machine learning model in which the work procedure information is output when the image data in the manual and the text data in the manual are input. For example, the manual analyzing unit 103 may use visual question answering (VQA), which is an example of a multimodal (image and text) method, as a method of machine learning.

The following is an example of text data generated based on the image data in the manual. For example, the text data generated based on the image data in the manual relates to marks (symbol information) included in the image data in the manual, such as the positional relationship between the target component (a component to be worked on, for example, a component to be replaced by the customer engineer) and the surrounding component, the direction in which the target component is to be moved, and the direction in which the target component is to be removed.

On which side is the target component located from the customer engineer's perspective?
Whereabouts is that side?
What is the color?
From where is the component to be moved (what is to be done)?
In which direction is the component to be moved?
Other
What is the shape?
What is the size?
How many are there?

Figure 7:
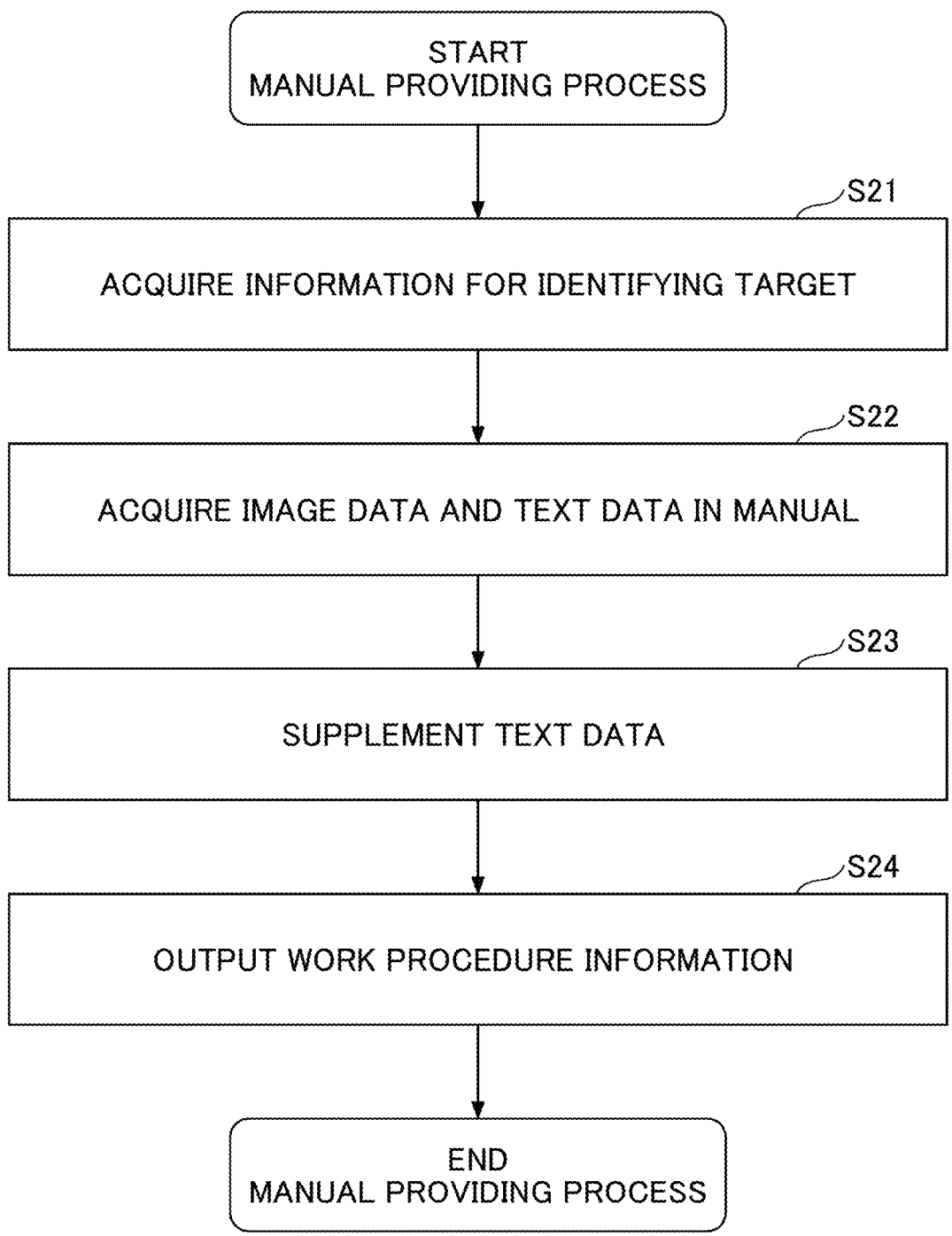
FIG. 7 is a flowchart of a manual providing process according to the first embodiment of the present invention.

FIG. 7 is a flowchart of a manual providing process according to an embodiment of the present invention.

In step S21, the target data input unit 201 acquires information (for example, image data) for identifying the target. Specifically, the target data input unit 201 acquires information (for example, image data) for identifying the target from the user terminal 30. For example, a target may be a target on which work is to be performed by a customer engineer (e.g., a component to be replaced by a customer engineer). Smart glasses worn by a customer engineer or the like may capture an image and transmit the image to the manual providing apparatus 20, or a smart device or the like may capture an image and transmit the image to the manual providing apparatus 20 via an interface such as a chat box or an input box in a web browser.

As described above, the work procedure information selecting unit 202 may present previously generated work procedure information (which may be stored in any memory device) or may generate and present work procedure information in response to a request from the user terminal 30.

When presenting the previously generated work procedure information, in step S22, the work procedure information selecting unit 202 acquires at least one of image data or text data in the manual. Specifically, the work procedure information selecting unit 202 identifies at least one of image data in the manual or text data in the manual corresponding to the information for identifying the target of step S201. For example, the work procedure information selecting unit 202 identifies the target included in the image data of step S201 and acquires at least one of the image data in the manual or the text data in the manual describing the target.

When generating and presenting work procedure information in response to a request from the user terminal 30, in step S22, the work procedure information selecting unit 202 acquires image data and text data in the manual. Specifically, the work procedure information selecting unit 202 identifies image data in the manual and text data in the manual corresponding to the information for identifying the target of step S201. For example, the work procedure information selecting unit 202 identifies the target included in the image data of step S201 and acquires the image data in the manual and the text data in the manual describing the target.

In step S23, the work procedure information selecting unit 202 supplements the text data.

When presenting the previously generated work procedure information, in step S23, the work procedure information selecting unit 202 identifies the previously generated work procedure information associated with at least one of the image data in the manual or the text data in the manual identified in step S22.

When generating and presenting work procedure information in response to a request from the user terminal 30, in step S23, the work procedure information selecting unit 202 inputs the image data in the manual and the text data in the manual identified in step S22 to the machine learning model (the machine learning model generated by the manual analyzing process of FIG. 6) to cause the machine learning model to output the work procedure information.

In an embodiment of the present invention, the work procedure information (i.e., the text data after being supplemented) includes the component name obtained from the text data in the manual (i.e., the text data before being supplemented), and, therefore, the work procedure information can be selected without using the text data in the manual, by matching the "component name" with the "component name obtained from the information for identifying the target of step S21 (by a caption, sound recognition, etc.)".

In step S24, the work procedure information output unit 203 outputs the work procedure information. Specifically, the work procedure information output unit 203 outputs the work procedure information to the user terminal 30. For example, the work procedure information output unit 203 outputs the work procedure information by voice sound. The work procedure information output unit 203 may display the work procedure information on a smart device, display Augmented Reality (AR) of the work procedure information on smart glasses, and the like.

<Effect>

Thus, in one embodiment of the present invention, a customer engineer or the like can listen to the voice sound of the work procedure information in which the text based on an image in the manual is added to the text in the manual. Accordingly, a customer engineer and the like can understand the manual with only text information even without any images. As a result, the customer engineer and the like can perform the work while understanding the procedure for repairing a precision device such as a multifunction peripheral, without changing his or her posture in order to view a manual or holding the manual with soiled hands to refer to the manual.

Second Embodiment

<Outline>

Figure 8:
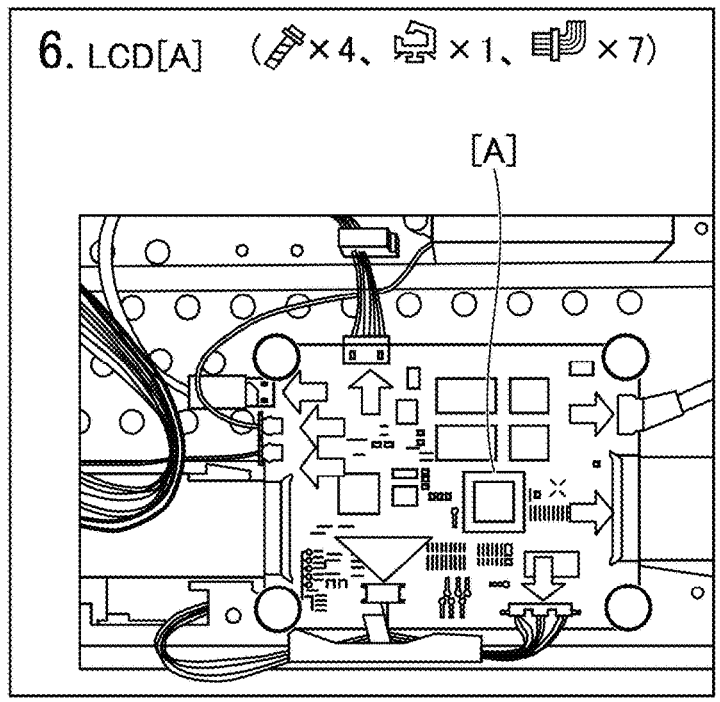
FIG. 8 is a diagram for explaining an outline according to a second embodiment of the present invention.

FIG. 8 is a diagram illustrating an outline of an embodiment of the present invention. In an embodiment of the present invention, it is possible to generate and present work procedure information in which the text data based on the symbols and edges included in the image data in the manual (specifically, the relative position information representing the relative position between a target component (the component to be worked on) and a surrounding component (a component around the target component)) is added to the text data in the manual.

For example, it is assumed that a manual describes a procedure as illustrated in FIG. 8. In this example, screws, a clamp, and connectors are the target components (the components to be worked on) and an LCD is a surrounding component (a component around the target component). It is assumed that the symbols (in this example, arrows, circles, and a triangle) are defined to mean "remove" the component indicated by a symbol.

Specifically, it is assumed that the manual includes text data, such as "an LCD [A], a screw (may be a screw mark)×4, a clamp (may be a clamp mark)×1, a connector (may be a connector mark)×7)", and image data. The text data includes the name of the surrounding component (LCD), the name or mark of the target component (the screw, the clamp, the connector), and the number of each of the target components (four screws, one clamp, and seven connectors). The image data is superimposed with four circles, one triangle, and seven arrows. In this example, the surrounding component [A] is indicated in the image data, and is described as LCD [A] in the text data. Note that there may be no description by text data (i.e., only an indication in the image data by a mark).

Such image data is used to identify the position of the target component (the screw, the clamp, the connector) based on the symbols (four circular symbols, one triangular symbol, seven arrow symbols), and to identify the range of the surrounding component (LCD), and the range where the surrounding component (LCD) and the target components (screw, clamp, connector) are present, based on the edges.

In an embodiment of the present invention, text data (also referred to as work procedure information) that expresses the content of the work without omission, can be generated and presented by adding, to the text data in the manual, text (specifically, relative position information indicating the relative position relationship between the target component (a component subject to the work) and the surrounding component (a component around the target component)) that is generated based on the symbols and the edges included in the image data (image data in the manual).

The following is an example of work procedure information.

Before (i.e., Text Data in the Manual)
    LCD [A], (screw×4, clamp×1, connector×7)
After (i.e., Work Procedure Information Supplemented by Adding Text Data Based on Symbols and Edges in the Manual, to Text Data in the Manual)
    Procedure for removing the LCD.
    First, remove the clamp. The clamp is on the left of the lower side of the LCD.
    Next, remove the seven connectors. There is one on the right of the lower side of the LCD, three on the top of the left side of the LCD, one on the left of the top side of the LCD, and two on the right side of the LCD.
    Finally, remove the four screws. The screws are located at the four corners of the LCD.
    With respect to the order, the rule base of components other than the screw (in the order of the text part of Before)→the screws can be used.

As described above, it can be seen that work procedure information is presented in a state in which the text data of Before is supplemented by the position of the target component relative to the surrounding component. Further, the work procedure information may be supplemented with the work (e.g., removal) to be performed on the target component. The notation of [A] that is used in a case of confirming the work procedure together with the image, may be deleted from the work procedure information as in the present example, or may be replaced with words indicating the content represented by [A].

<Overall Configuration>

Figure 9:
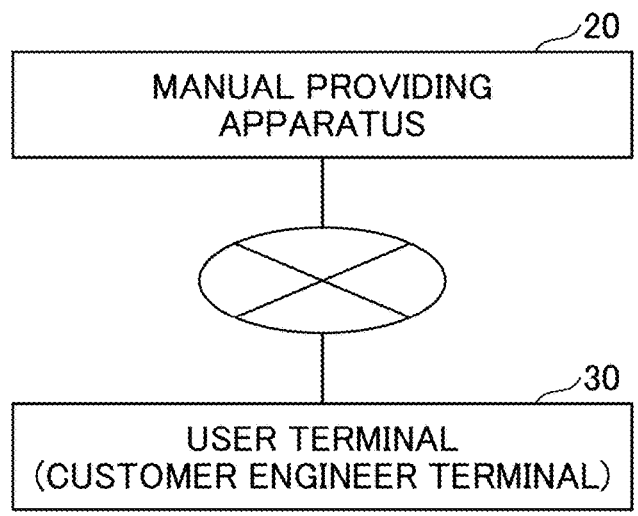
FIG. 9 is an overall configuration diagram according to the second embodiment of the present invention.

FIG. 9 is an overall configuration diagram according to an embodiment of the present invention. As illustrated in FIG. 2, the manual reading support system 1 may include the manual providing apparatus 20 and the user terminal 30 (customer engineer terminal). The user terminal 30 can transmit and receive data to and from the manual providing apparatus 20 via any network.

The manual providing apparatus 20 presents, upon request from the user terminal 30, work procedure information that is supplemented such that an electronic manual including text data and image data can be understood only by the text data. Specifically, the manual providing apparatus 20 acquires image data of a target object (for example, a component of a precision device such as a multifunction peripheral) from the user terminal 30. The manual providing apparatus 20 identifies the image data in the manual corresponding to the image data of the target. The manual providing apparatus 20 detects symbols and edges included in the image data in the manual. The manual providing apparatus 20 generates work procedure information that is supplemented by adding the text data generated based on the symbols and the edges included in the image data in the manual, to the text data in the manual. The manual providing apparatus 20 outputs the work procedure information to the user terminal 30. The manual providing apparatus 20 is configured by one or more computers.

The user terminal 30 (customer engineer terminal) is a terminal used by a person using a manual according to an embodiment of the present invention (e.g., a customer engineer who repairs precision equipment such as a multi-function peripheral). Specifically, the user terminal 30 transmits the image data in which the target is captured to the manual providing apparatus 20. The user terminal 30 receives the work procedure information on the target from the manual providing apparatus 20. For example, the user terminal 30 may be a smart device, smart glasses, or the like.

The hardware configuration of the second embodiment is the same as that of the first embodiment illustrated in FIG. 3.

<Functional Blocks>

Figure 10:
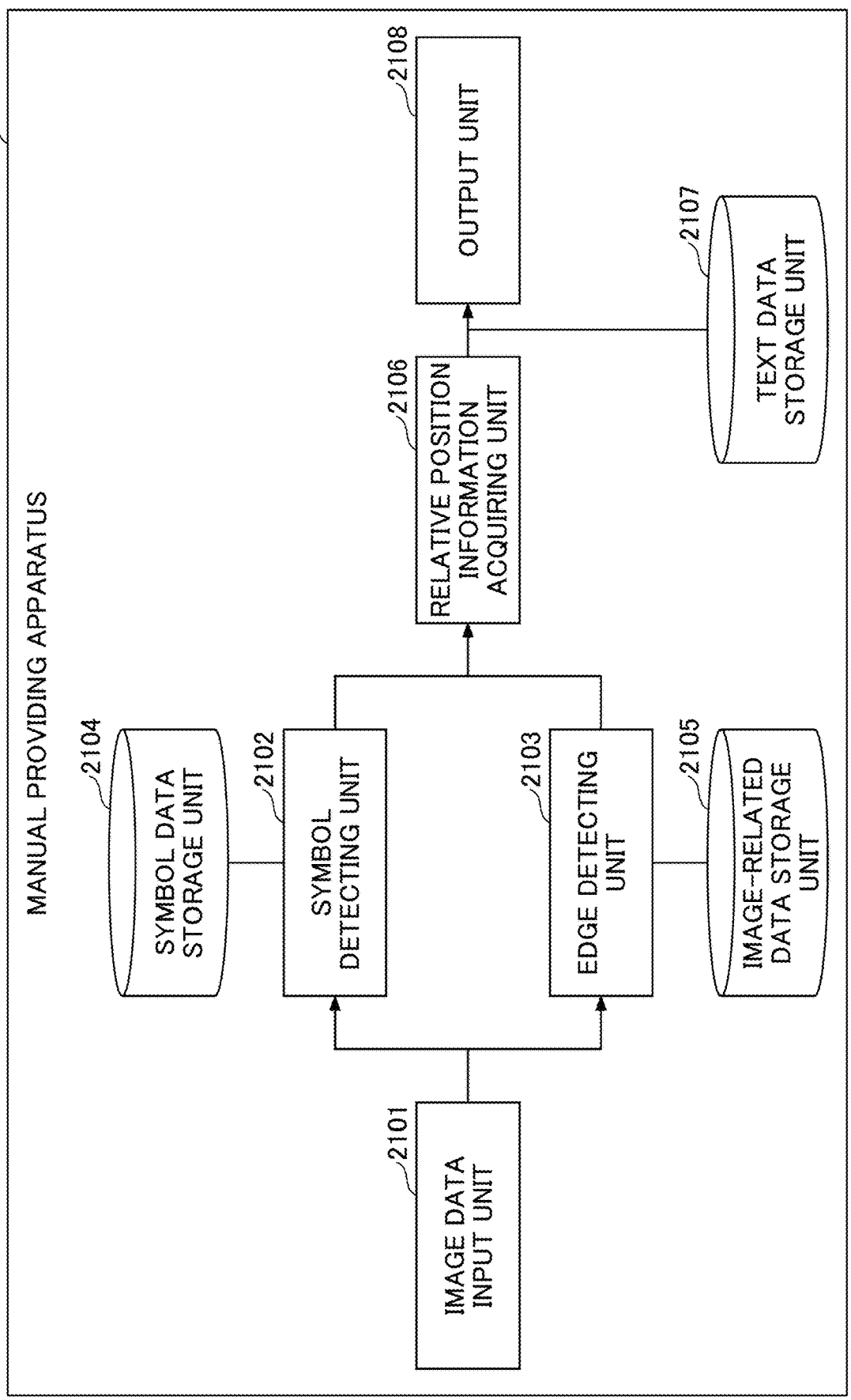
FIG. 10 is a functional block diagram of a manual providing apparatus according to the second embodiment of the present invention.

FIG. 10 is a functional block diagram of the manual providing apparatus 20 according to an embodiment of the present invention. As illustrated in FIG. 4, the manual providing apparatus 20 includes an image data input unit 2101, a symbol detecting unit 2102, an edge detecting unit 2103, a symbol data storage unit 2104, an image-related data storage unit 2105, a relative position information acquiring unit 2106, a text data storage unit 2107, and an output unit 2108. The stored data may be inside or outside the apparatus (system). The manual providing apparatus 20 functions as the image data input unit 2101, the symbol detecting unit 2102, the edge detecting unit 2103, the relative position information acquiring unit 2106, and the output unit 2108 by executing a program. Each of these units will be described below.

The image data input unit 2101 acquires image data included in the manual. Image data is electronic data in which symbols are superimposed on photos, illustrations, etc., indicating the work procedure.

For example, the image data input unit 2101 acquires the image data in the manual based on the image data of the target acquired from the user terminal 30. Specifically, the image data input unit 2101 acquires image data of a target (for example, a component of a precision device such as a multifunction peripheral) from the user terminal 30. The image data input unit 2101 identifies the image data in the manual corresponding to the image data of the target acquired from the user terminal 30 and uses the identified image data.

The symbol detecting unit 2102 detects a symbol included in the image data. Specifically, the symbol detecting unit 2102 detects a symbol included in the image data by referring to the information stored in the symbol data storage unit 2104. For example, the symbol detecting unit 2102 detects an area in the image data having information (for example, color (e.g., red or blue), density, or the like) that is characteristic compared to other parts of the image data, as a symbol. The detected symbol identifies the position of the target component (e.g., a position indicated by an arrow or a triangle, or a position in a circle or a square). For example, the symbol detecting unit 2102 may detect the symbol by using a technique such as template matching.

The edge detecting unit 2103 (component detecting unit) detects the edge included in the image data. The detected edges identify the range of a surrounding component and the range where the surrounding component and the target component are present. Specifically, the edge detecting unit 2103 identifies components included in the image data by referring to the information stored in the image-related data storage unit 2105. For example, the edge detecting unit 2103 identifies, as a range of a component such as a surrounding component, an area (an area surrounded by edges) in the image data having information that is characteristic compared to other areas in the image data, other than the area of a symbol detected by the symbol detecting unit 2102. For example, the edge detecting unit 2103 can detect the edge by using existing techniques such as a canny method, blob analysis, convex hull calculation, and the like. For example, the edge detecting unit 2103 can detect some of or all of the target component and surrounding components by using a method such as CAD matching.

The symbol data storage unit 2104 stores data of symbols (that is, symbols included in the image data) used in the manual. Specifically, the shape, the color, and the like of each symbol are stored in the symbol data storage unit 2104. Further, the symbol data storage unit 2104 may store the work to be performed on the target component whose position is indicated by each symbol, the name of the target component whose position is indicated by each symbol, and the like.

The image-related data storage unit 2105 stores data (for example, computer-aided design (CAD) data) related to components in the image data included in the manual. Further, the image-related data storage unit 2105 may store the name of a component such as a surrounding component.

The relative position information acquiring unit 2106 acquires the relative position information of the target component and the surrounding component. Specifically, the relative position information acquiring unit 2106 acquires relative position information (for example, the position of the target component relative to the surrounding component) based on the symbol detected by the symbol detecting unit 2102 and the edge detected by the edge detecting unit 2103 (that is, based on the range of components such as the surrounding components). The relative position information acquiring unit 2106 may acquire information on work to be performed on the target component whose position is indicated by each symbol.

The text data storage unit 2107 stores text data included in the manual. It is assumed that the text data corresponding to the image data acquired by the image data input unit 2101 (that is, the text data explaining the corresponding image data in the manual) is used.

The output unit 2108 outputs the work procedure information in which the relative position information is added to the text data in the manual. Specifically, the output unit 2108 generates and outputs work procedure information by adding the information acquired by the relative position information acquiring unit 2106 to the text data corresponding to the image data. For example, the work procedure information output unit 203 transmits the voice sound data of the work procedure information to the user terminal 30.

The output unit 2108 couples the relative position information (e.g., "upper right of") that is text data, to the text data corresponding to the image data (e.g., "(remove screw) at the upper right of the LCD"). If the text corresponding to the image is a sentence such as "remove the screw of the LCD", "screw" is searched and the text is placed after the screw. A method to analyze the sequence of word classes in a sentence (morphological analysis) is used to perform rule-based processing such as placing the text before "noun (LCD)", "particle (of)" and after "noun (screw)", to identify the place to insert the text to obtain "remove the screw at the upper right of the LCD".

The text data originally associated with image data may be extracted, and when the association is unclear, the optimum text can be selected from the list of registered text data and added as external input.

<<Method of Detecting Symbols and Edges>>

A more detailed description of the method of detecting symbols and edges is provided. Hereinafter, an example will be described in which a symbol is a circle in FIG. 8 and a surrounding component is an LCD in FIG. 8. Note that the following (Example 1) to (Example 8) may be combined.

Example 1

In one embodiment of the present invention, a surrounding component such as an LCD is generally in a "rectangular" shape, and, therefore, even if there is a partially missing portion, the edge detecting unit 2103 can detect a rectangular shape (perform a graphic (rectangular) detection) based on the information that the outermost long line segments are arranged to form a rectangular shape (the two sets of two parallel lines intersect perpendicularly when the two sets of parallel lines are extended). It is possible that other shapes are set as detection targets.

Example 2

In one embodiment of the present invention, the edge detecting unit 2103 can detect the area of the LCD and determine the coordinates of the end of the LCD area as the edge by using the difference in RGB values, because there is a difference in RGB values between the green color of the LCD and the light gray color behind the LCD.

Example 3

In one embodiment of the present invention, the edge detecting unit 2103 can detect the area of the LCD and determine the coordinates of the end of the LCD area as the edge by using the difference in pixel values, because there is a difference in pixel values between the green color of the LCD and the light gray color behind the LCD.

Example 4

In one embodiment of the present invention, there is [A] and a set of lines in FIG. 8. The edge detecting unit 2103 can acquire an area having a value close to an RGB value or a pixel value adjacent to the leading end of the line (by setting a threshold), and determine the coordinates at the end of the area as the edge.

Example 5

In one embodiment of the present invention, when there is more than one symbol, the edge detecting unit 2103 can determine the smallest area including the symbol as the smallest area of the candidate component, and the coordinates of the end of the area with a pixel value or a RBG value close to those of the smallest area of the candidate component can be determined as the edge.

Example 6

In one embodiment of the present invention, the edge detecting unit 2103 can determine the position of the LCD by a combination of edge detection and morphology processing. When the difference in pixel values between the LCD (surrounding component) and the background component (background plate) is large (dark green and light gray) as illustrated in FIG. 8, such a combination may not be necessary. However, when the difference in pixel values between the surrounding component and the background component is small, the edge is detected and the fine edge in the surrounding component is expanded by the morphology process (by increasing the high pixel value area in the surrounding component), the area of the surrounding component is acquired by increasing the difference in pixel values between the surrounding component and the background component, and the coordinates of the end can be determined as the edge.

Example 7

In one embodiment of the present invention, the edge detecting unit 2103 can detect the edge by template matching (similar image matching) by using data of a surrounding component (such as CAD, although not limited thereto) as described above. In the case of CAD, the color information of the actual surrounding component may be different, but to be prepared for this case, discarding the color information may be an idea. Further, when the angles of the CAD and photos in images in the manual differ, it is possible to perform a method of "comparing a wireframe image rendered after removing hidden lines with the image in which only the line segments are drawn by performing linear extraction from the input image, to estimate the orientation of the input image", so that the components can be recognized as the same component even if the angles are different, thereby improving the accuracy.

Example 8

If photos are used instead of the CAD data in Example 7, the threshold may need to be changed due to the impact of lighting and the like. In such cases, a mechanism may be provided such that the threshold may be changed relatively (contrast with surrounding components) or dynamically (e.g., interactively specified, converted to information that is less affected by lighting (e.g., the H space in HSV).

<Processing Method>

FIG. 11 is a flowchart of a manual providing process according to an embodiment of the present invention.

In step S31, the image data input unit 2101 acquires information (for example, image data) for identifying the target from the user terminal 30. For example, the target may be a target to be worked on by a customer engineer (e.g., a component to be replaced by a customer engineer). Smart glasses worn by a customer engineer or the like may capture an image and transmit the image to the manual providing apparatus 20, or a smart device or the like may capture an image and transmit the image to the manual providing apparatus 20 via an interface such as a chat box or an input box in a web browser.

In step S32, the image data input unit 2101 acquires image data in the manual. Specifically, the image data input unit 2101 identifies image data in the manual corresponding to the image data of the target acquired from the user terminal 30 in step S31. For example, the image data input unit 2101 identifies the target included in the image data of step S31 and acquires image data in the manual describing the target.

In step S33, the symbol detecting unit 2102 detects a symbol included in image data in the manual of step S32. The edge detecting unit 2103 detects an edge included in the image data in the manual of step S32 (that is, identifies a range of a component such as a surrounding component).

In step S34, the relative position information acquiring unit 2106 acquires the relative position information of the target component and the surrounding component. Specifically, the relative position information acquiring unit 2106 acquires relative position information (for example, the position of the target component relative to the surrounding component) based on the symbol detected by the symbol detecting unit 2102 in step S33 and the edge detected by the edge detecting unit 2103 in step S33 (that is, based on the range of components such as the surrounding components or the like). The relative position information acquiring unit 2106 may acquire information on work to be performed on the target component whose position is indicated by each symbol.

In step S35, the output unit 2108 generates the work procedure information by adding the relative position information acquired in step S34 to the text data corresponding to the image data.

The manual providing apparatus 20 may present previously generated work procedure information (which may be stored in any storage device) or may generate and present work procedure information in response to a request from the user terminal 30.

When previously generated work procedure information is presented, the manual providing apparatus 20 acquires, from the user terminal 30, information (e.g., image data) for identifying the target (e.g., a component of a precision device such as a multifunction peripheral). The manual providing apparatus 20 identifies at least one of image data or text data in the manual corresponding to information for identifying a target. The manual providing apparatus 20 identifies previously generated work procedure information associated with at least one of image data or text data in the manual. The manual providing apparatus 20 outputs the work procedure information to the user terminal 30.

In step S36, the output unit 2108 outputs the work procedure information generated in step S35. Specifically, the output unit 2108 outputs the work procedure information to the user terminal 30. For example, the output unit 2108 outputs work procedure information by voice sound. The output unit 2108 may display the work procedure information on a smart device, display Augmented Reality (AR) of the work procedure information on smart glasses, and the like.

<Effect>

Thus, in one embodiment of the present invention, a customer engineer or the like can listen to the voice sound of work procedure information in which text based on symbols and edges included in the image in the manual is added to the text in the manual. Accordingly, a customer engineer and the like can understand the manual with only text information even without any images. As a result, the customer engineer and the like can perform the work while understanding the procedure for repairing a precision device such as a multifunction peripheral, without changing his or her posture in order to view a manual or holding the manual with soiled hands to refer to the manual.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

According to one embodiment of the present invention, a manual can be understood without any images of the manual.

The apparatus and the manual providing apparatus are not limited to the specific embodiments described in the detailed description, and variations and modifications may be made without departing from the and scope of the present invention.

What is claimed is:

1. An apparatus comprising:
an in-manual image data storage unit configured to store image data included in a manual;
an in-manual text data storage unit configured to store text data included in the manual;
circuitry; and
a memory storing computer-executable instructions that cause the circuitry to execute:
acquiring, from a user terminal, information for identifying a target;
identifying image data in the manual and text data in the manual corresponding to the information for identifying the target;
inputting, to a machine learning model, the image data in the manual and the text data in the manual, to cause the machine learning model to output work procedure information; and
outputting the work procedure information to the user terminal, wherein the instructions further cause the circuitry to execute:
training the machine learning model based on training data including the image data that is stored in the in-manual image data storage unit and the text data that is stored in the in-manual text data storage unit as input data, and supplemented text data, as output data, that is supplemented by text data generated based on the image data in the manual;
wherein the work procedure information is generated by supplementing the text data related to the target with first text indicating a position of the target and second text indicating a direction to move the target, said first and second texts being generated based on an image indicating the position of the target included in the image data and an image indicating the direction to move the target, and
wherein the work procedure information is output by voice sound.

* * * * *